US012614298B2

(12) United States Patent
Oigawa

(10) Patent No.: US 12,614,298 B2
(45) Date of Patent: Apr. 28, 2026

(54) DISTANCE MEASUREMENT DEVICE, MOVABLE APPARATUS, AND CONTROL METHOD

(71) Applicant: CANON KABUSHIKI KAISHA, Tokyo (JP)

(72) Inventor: Makoto Oigawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 18/438,703

(22) Filed: Feb. 12, 2024

(65) Prior Publication Data

US 2024/0281991 A1 Aug. 22, 2024

(30) Foreign Application Priority Data

Feb. 22, 2023 (JP) ................................ 2023-025887

(51) Int. Cl.
*G06T 7/593* (2017.01)
*G06T 7/571* (2017.01)
*G06T 7/579* (2017.01)

(52) U.S. Cl.
CPC .............. *G06T 7/593* (2017.01); *G06T 7/571* (2017.01); *G06T 7/579* (2017.01)

(58) Field of Classification Search
CPC ......... G06T 7/593; G06T 7/571; G06T 7/579; G06T 2207/10012; G06T 2207/30252;
(Continued)

(56) References Cited

U.S. PATENT DOCUMENTS 8,520,059 B2 8/2013 Aoki
9,596,403 B2 * 3/2017 Ikemoto .................. G06T 7/586
(Continued)

FOREIGN PATENT DOCUMENTS

JP 2008-309637 A 12/2008
JP 2011-022072 A 2/2011
(Continued)

OTHER PUBLICATIONS

Sep. 6, 2024 European Official Action in European Patent Appln. No. 24158059.6.
(Continued)

*Primary Examiner* — Mia M Thomas
(74) *Attorney, Agent, or Firm* — Venable LLP

(57) ABSTRACT

A distance measurement device includes an image capturing unit configured to be capable of capturing images of first image information and second image information having parallax therebetween from one optical system, and a parallax calculation unit configured to extract image information within a search window from each of the first image information and the second image information and calculate an amount of parallax using a correlation between image information of the first image information within the search window and image information of the second image information within the search window which have been extracted. The parallax calculation unit sets the search window on the basis of an optical characteristic value of an image height for performing parallax calculation. The optical characteristic value corresponds a centroidal gap between a centroid of a first luminous flux forming the first image information and a centroid of a second luminous flux forming the second image information on an exit pupil of the optical system.

11 Claims, 11 Drawing Sheets

(58) Field of Classification Search
CPC ..................... G06T 7/70; G06T 7/0002; G06T 2207/10004; G06T 2207/20228; G01C 3/085; G01C 3/24; G01C 3/02; B60W 30/08; B60W 2420/403; B60W 2554/802
See application file for complete search history.

(56) References Cited

U.S. PATENT DOCUMENTS

| | | | | |
|---|---|---|---|---|
| 10,600,195 | B2 | 3/2020 | Ikemoto | |
| 11,941,878 | B2 * | 3/2024 | Boroughs | G06V 10/763 |
| 12,082,325 | B1 * | 9/2024 | Wittenberg | G06T 7/70 |
| 2013/0010078 | A1 | 1/2013 | Aoki | |
| 2013/0121560 | A1 | 5/2013 | Hirai | |
| 2015/0189186 | A1 * | 7/2015 | Fahn | G06V 10/462<br>348/239 |
| 2015/0281559 | A1 * | 10/2015 | Ikemoto | H04N 23/6811<br>348/208.12 |
| 2017/0127048 | A1 * | 5/2017 | Nobayashi | H04N 13/128 |
| 2017/0223334 | A1 * | 8/2017 | Nobayashi | H04N 13/128 |
| 2018/0114327 | A1 | 4/2018 | Ikemoto | |
| 2022/0232166 | A1 * | 7/2022 | Eguchi | G03B 13/20 |
| 2022/0309694 | A1 | 9/2022 | Nobayashi | |
| 2022/0314886 | A1 * | 10/2022 | Oigawa | B60R 1/23 |
| 2023/0274444 | A1 | 8/2023 | Oigawa | |
| 2023/0286548 | A1 * | 9/2023 | Tanaka | B60W 60/00272 |
| 2023/0419520 | A1 * | 12/2023 | Nishiyama | H04N 23/611 |
| 2025/0200940 | A1 * | 6/2025 | Park | G06V 10/764 |

FOREIGN PATENT DOCUMENTS

| | | | |
|---|---|---|---|
| JP | 5365387 | B2 | 12/2013 |
| JP | 2018-017568 | A | 2/2018 |
| JP | 2019-197140 | A | 11/2019 |
| JP | 2021-076760 | A | 5/2021 |
| JP | 6921500 | B2 | 8/2021 |
| WO | 2011/118089 | A1 | 9/2011 |

OTHER PUBLICATIONS

Aug. 26, 2025 Official Action in Japanese Patent Appln. No. 2023-025887.

* cited by examiner

DISTANCE MEASUREMENT DEVICE, MOVABLE APPARATUS, AND CONTROL METHOD

BACKGROUND OF THE INVENTION

Field of the Invention

The present invention relates to a distance measurement device, a movable apparatus, and a control method, and the like.

Description of the Related Art

Regarding image capturing devices, there are stereo camera devices which calculate an amount of parallax of a set of images having parallax therebetween and captured from different visual points and measure a distance to a subject. The amount of parallax is calculated by extracting a region referred to as a search window from each of the images from different visual points and obtaining an amount of movement of the search window between images with matching patterns within the search window region using a known correlation calculation method.

Japanese Patent No. 5365387 discloses a technique of changing the size and the shape of a search window during parallax calculation in a stereo camera in accordance with an image height, specifically a technique of performing changing in accordance with an amount of distortion correction depending on an image height.

In addition, Japanese Patent No. 6921500 discloses a constitution capable of acquiring a set of images having parallax therebetween with one camera. Each pixel of an image capturing element is constituted to have divided photoelectric conversion portions while sharing a microlens, and each of the photoelectric conversion portions receives one of luminous fluxes which have passed through different pupil regions in one optical system, thereby acquiring a set of images having parallax therebetween. This is referred as a pupil division phase difference distance measurement method.

In the pupil division phase difference method disclosed in Japanese Patent No. 6921500, when there is vignetting of the optical system, the value of a baseline length varies in accordance with the image height, and accuracy of distance measurement varies in accordance with the image height. However, in the technique disclosed in Japanese Patent No. 5365387, since the size and the shape of the search window are set in accordance with the amount of distortion correction, it is difficult to reduce this variation in accuracy of distance measurement.

SUMMARY OF THE INVENTION

A distance measurement device according to an embodiment of the present invention includes an image capturing unit configured to be capable of capturing images of first image information and second image information having parallax therebetween from one optical system, and at least one processor or circuit configured to function as: a parallax calculation unit configured to extract image information within a search window from each of the first image information and the second image information and calculate an amount of parallax using a correlation between image information of the first image information within the search window and image information of the second image information within the search window which have been extracted, wherein the parallax calculation unit sets the search window on the basis of an optical characteristic value of an image height for performing parallax calculation, and wherein the optical characteristic value corresponds to a centroidal gap between a centroid of a first luminous flux forming the first image information and a centroid of a second luminous flux forming the second image information on an exit pupil of the optical system.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In First Embodiment of the present invention, a distance measurement device using a pupil division phase difference method, and a technique of setting conditions for a search window on the basis of an optical characteristic value of an image height for calculating parallax will be described.

<Device Constitution>

Figure 1:
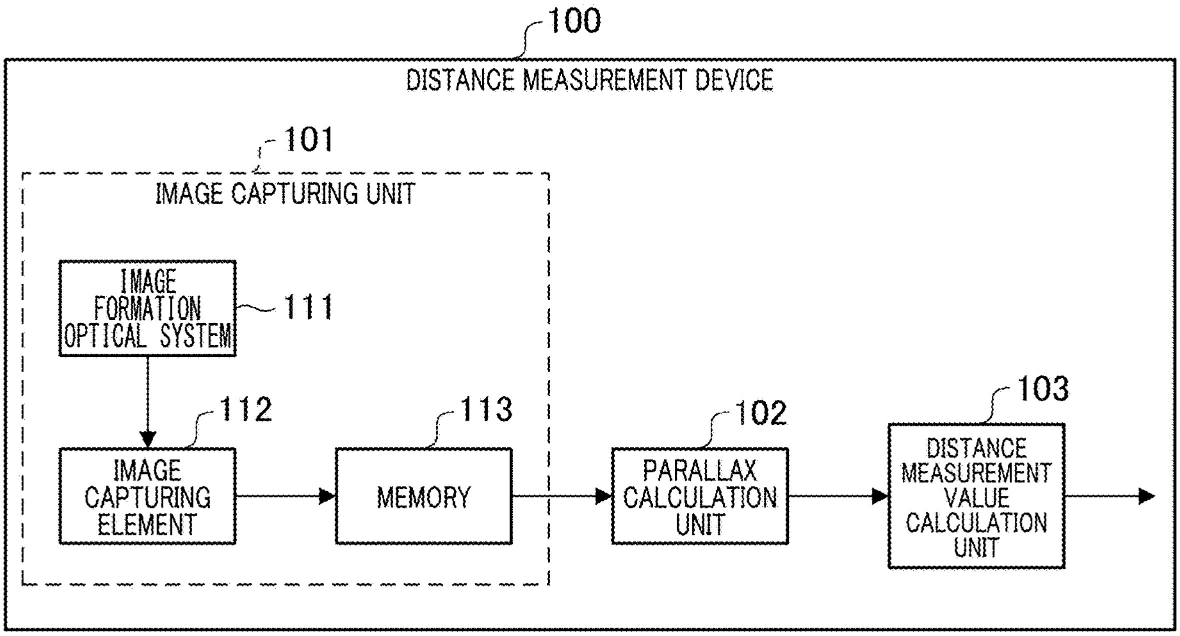
FIG. 1 is a view showing a constitution of a distance measurement device according to First Embodiment of the present invention.

FIG. 1 is a view showing a constitution of a distance measurement device according to First Embodiment of the present invention. A distance measurement device 100 includes an image capturing unit 101, a parallax calculation unit 102, and a distance measurement value calculation unit 103. The image capturing unit 101 includes an image formation optical system 111, an image capturing element 112, and a memory 113.

Figure 2A:
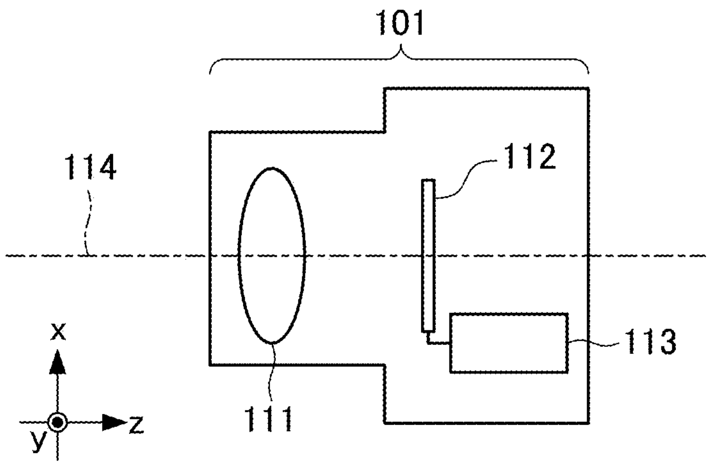
FIGS. 2A, 2B, and 2C are views showing detailed constitutions of an image capturing unit 101.

FIG. 2 is a view showing detailed constitutions of the image capturing unit 101 shown in FIG. 1. FIG. 2A is a view showing a schema of disposition of each of constituents of the image capturing unit 101. As shown in FIG. 2A, the image capturing unit 101 includes the image formation optical system 111, the image capturing element 112, and the memory 113.

The memory 113 may be constituted to include a central processing unit (which will hereinafter be referred to as a CPU) provided together with a memory storing an arithmetic processing program.

The image formation optical system 111 is an image capturing lens of the image capturing unit 101 and has a function of forming a subject image on the image capturing element 112. The image formation optical system 111 may be constituted of a plurality of lens groups (not shown). In this specification, a z axis is parallel to an optical axis 114 of the image formation optical system 111. Moreover, an x axis and a y axis are axes perpendicular to each other and perpendicular to the optical axis.

The image capturing element 112 is an image capturing element constituted of a complementary metal oxide semiconductor (CMOS) or a charge coupled device (CCD) and having a function of distance measurement performed by a pupil division phase difference distance measurement method. A subject image formed on the image capturing element 112 through the image formation optical system 111 is photoelectrically converted by the image capturing element 112. An image signal based on a subject image is acquired due to this photoelectric conversion, and this image signal is stored in the memory 113.

Figure 2B:
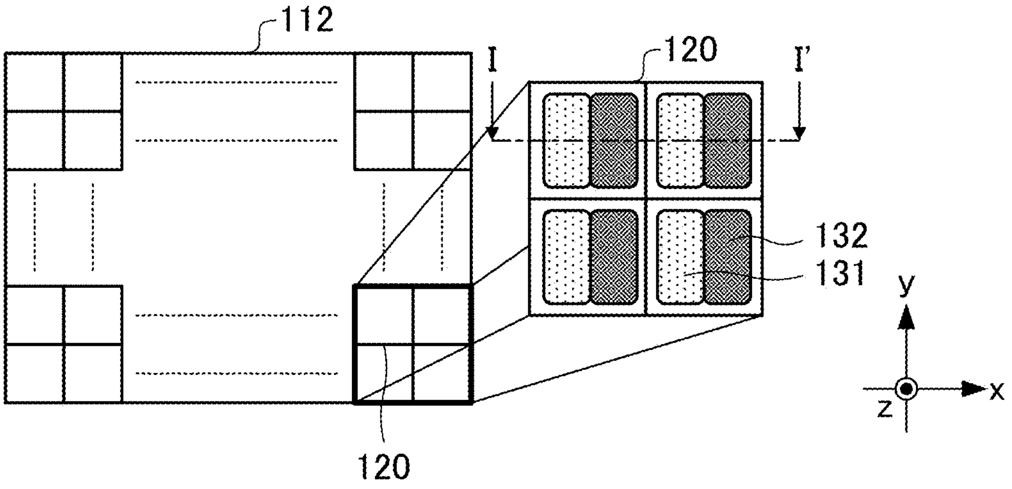

FIG. 2B is an xy cross-sectional view of the image capturing element 112. That is, FIG. 2B is a view showing the image capturing element 112 cut along a plane orthogonal to the z axis. The image capturing element 112 is constituted by disposing a plurality of pixels 120 in a matrix shape. FIG. 2B shows some pixels 120 of the image capturing element 112 in an enlarged manner and shows the I-I' cut plane of the cross-sectional view of FIG. 2C.

Figure 2C:
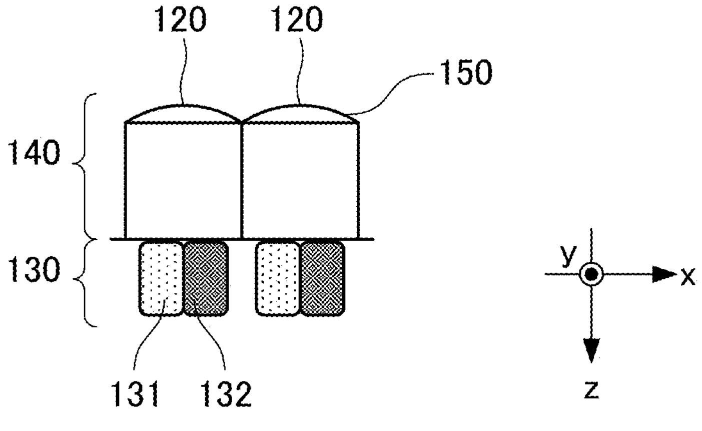

FIG. 2C is a view schematically showing the I-I' cross section of the pixels 120. Each of the plurality of the pixels 120 is constituted of a light reception layer 130 and a light guide layer 140.

The light reception layer 130 includes two photoelectric conversion portions, such as a first photoelectric conversion portion 131 and a second photoelectric conversion portion 132, as photoelectric conversion portions for photoelectrically converting received light. The light guide layer 140 includes a microlens 150, a color filter (not shown) through which light in a predetermined wavelength band passes, wirings (not shown) for image reading and pixel driving, and the like.

The microlens 150 is a lens for efficiently guiding luminous fluxes incident on the pixel 120 to the first photoelectric conversion portion 131 and the second photoelectric conversion portion 132.

The first photoelectric conversion portion 131 and the second photoelectric conversion portion 132 are formed of a raw material sensitive to the wavelength band to be detected, and in particular, when the wavelength band to be detected is in a visible range, Si is used. However, the raw material is not limited to this, and they are formed of an arbitrary raw material in accordance with a target wavelength band.

Figure 3A:
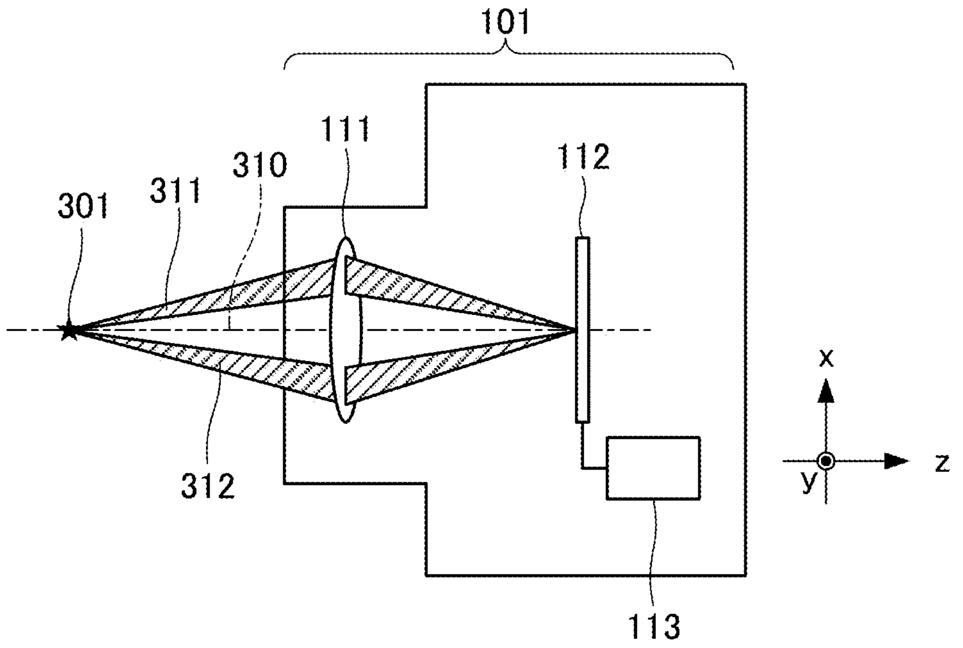
FIGS. 3A and 3B are explanatory schematic views of a method for acquiring a set of images having parallax therebetween and captured from different visual points using the image capturing unit 101.

FIG. 3 is an explanatory schematic view of a method for acquiring a set of images having parallax therebetween and captured from different visual points using the image capturing unit 101. FIG. 3A is a view showing a situation in which an image of a subject 301 is formed in the image capturing element 112.

With respect to a main ray 310, a first luminous flux 311 passes through a first region of an exit pupil (not shown) of the image formation optical system 111 and reaches the image capturing element 112. Similarly, with respect to the main ray 310, a second luminous flux 312 passes through a second region of the exit pupil (not shown) of the image formation optical system 111 and reaches the image capturing element 112.

Figure 3B:
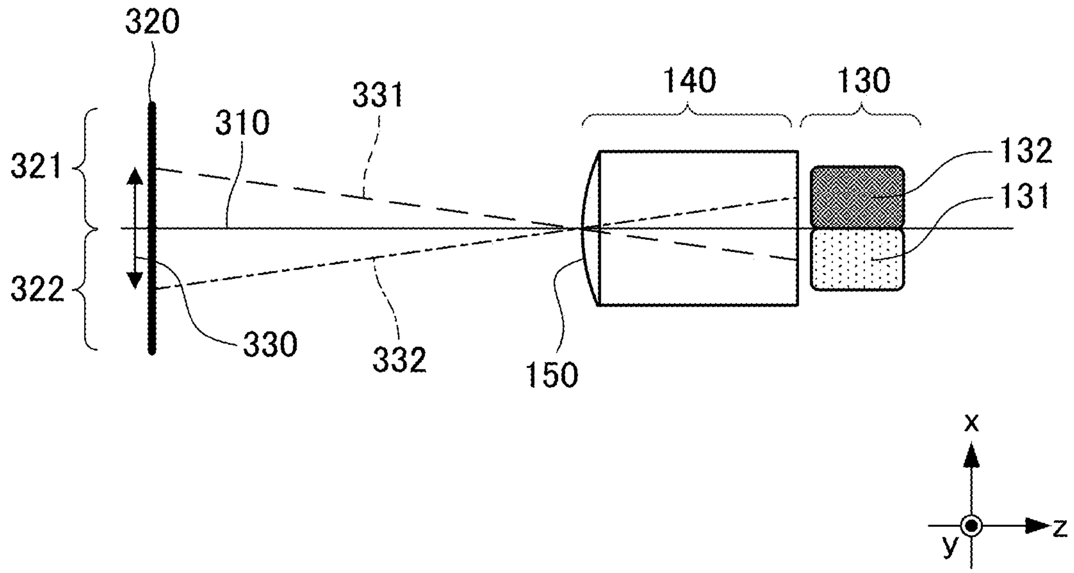

FIG. 3B is a view showing a relationship between the exit pupil and the pixel 120 of the image capturing element 112. A ray 331 is a centroid ray of the first luminous flux 311 passing through a first pupil region 321 in an exit pupil 320 and reaching the first photoelectric conversion portion 131 via the microlens 150. A ray 332 is a centroid ray of the second luminous flux 312 passing through a second pupil region 322 in the exit pupil 320 and reaching the second photoelectric conversion portion 132 via the microlens 150.

In this manner, regardless of the angle of view, at any image height of the image capturing element 112, centroid rays of respective luminous fluxes which have passed through different pupil regions reach the first photoelectric conversion portion 131 or the second photoelectric conversion portion 132 of the pixel 120 and are converted into image signals.

For this reason, a set of images from different visual points can be acquired by reading only an image signal obtained in one of the first photoelectric conversion portion 131 and the second photoelectric conversion portion 132. Only an image signal of the first photoelectric conversion portion 131 is read from all pixels and a first image from a first visual point is acquired.

Meanwhile, only an image signal of the second photoelectric conversion portion 132 is read from all pixels and a second image from a second visual point is acquired. Since the first image and the second image are images formed by luminous fluxes which have passed through different regions of the exit pupil, they are equivalent to a set of images captured from different visual points and are a set of images having parallax therebetween.

At this time, a centroidal gap 330 between a centroid 331 of the first luminous flux 311 and a centroid 332 of the second luminous flux 312 on the exit pupil becomes a distance between different visual points, namely a baseline length.

Figure 4A:
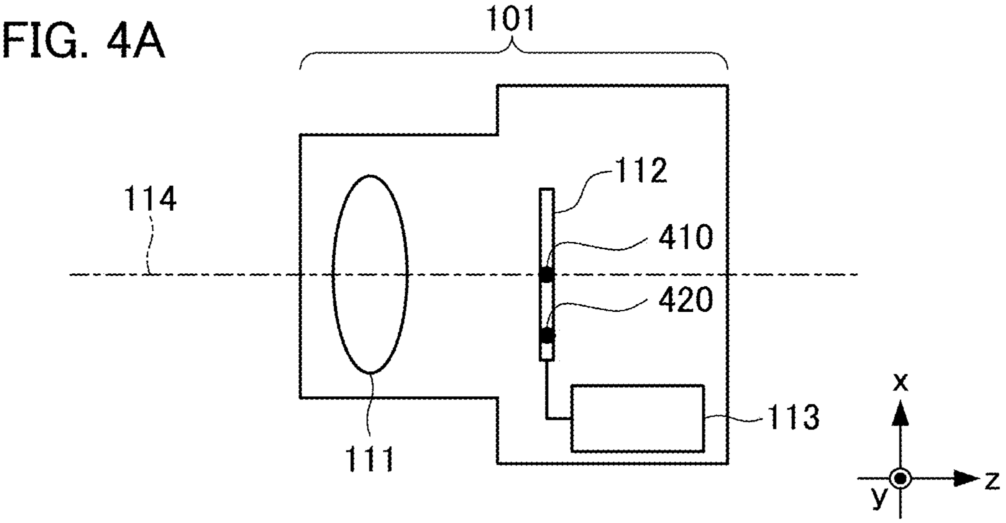
FIGS. 4A, 4B and 4C are explanatory views of a schema in which a baseline length differs depending on an angle of view in a pupil division phase difference method.
Figure 4B:
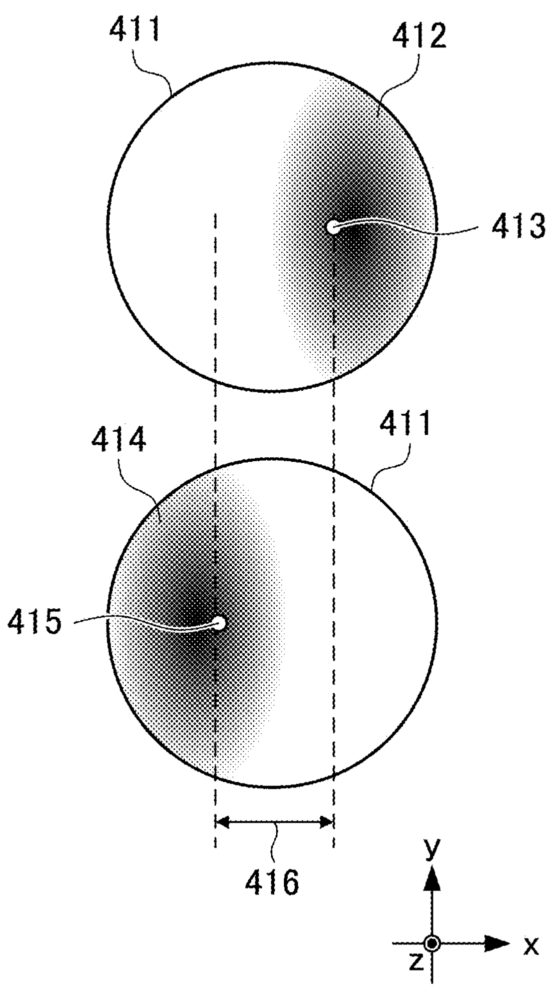
Figure 4C:
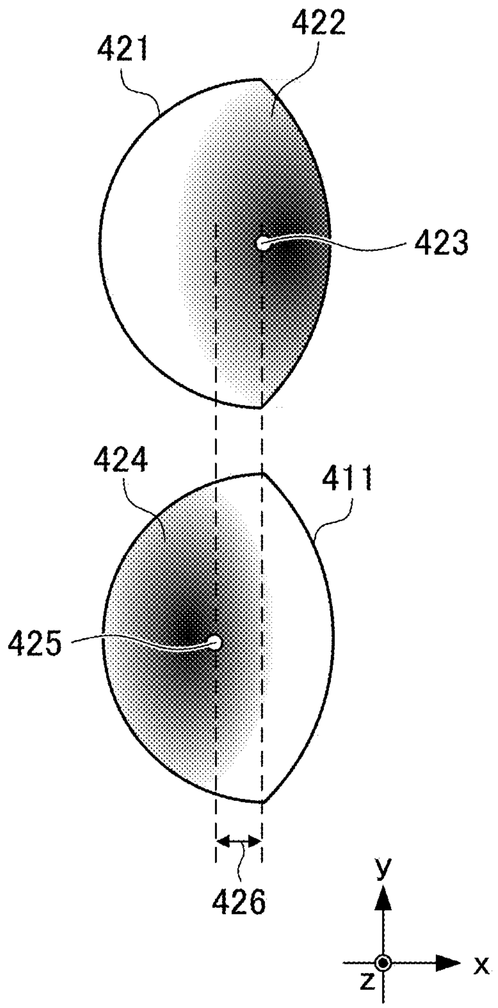

FIG. 4 is an explanatory view of a schema in which a baseline length differs depending on an angle of view in a pupil division phase difference method. FIG. 4A is a view showing the image capturing element 112 of the image capturing unit 101 according to Present Embodiment. FIG. 4B is a view showing the exit pupil of a central image height 410 on the image capturing element 112 and a distribution of the luminous fluxes. FIG. 4C is a view showing the exit pupil of a peripheral image height 420 on the image capturing element 112 and a distribution of the luminous fluxes.

In an exit pupil 411 of the central image height 410 shown in FIG. 4B, a centroidal gap 416 between a centroid 413 in a light quantity distribution 412 of a first luminous flux 331 and a centroid 415 in a light quantity distribution 414 of a second luminous flux 332 becomes the baseline length of the central image height 410. The first luminous flux 331 is a luminous flux which can be received by the first photoelectric conversion portion 131. The second luminous flux 332 is a luminous flux which can be received by the second photoelectric conversion portion 132.

Similarly, in an exit pupil 421 of the peripheral image height 420 shown in FIG. 4C, a centroidal gap 426 between a centroid 423 of a light quantity distribution 422 of the first luminous flux 331 and a centroid 425 of a light quantity distribution 424 of the second luminous flux 332 becomes the baseline length of the peripheral image height 420.

In the peripheral image height 420, due to an influence of vignetting caused by a lens barrel of an optical system (not shown), the shape of the exit pupil 421 changes compared to that of the exit pupil 411 of the central image height 410. As a result, a centroidal position of each luminous flux on the exit pupil 421 moves. For this reason, the centroidal gap 426 of the peripheral image height 420 varies with respect to the centroidal gap 416 of the central image height 410.

In this manner, in the pupil division phase difference method, the value of the baseline length varies depending on the image height. Meanwhile, in a stereo camera using two cameras, the gap between the cameras becomes the baseline length and this value does not vary depending on the image height. Therefore, variation in baseline length depending on the image height does not occur.

Figure 5:
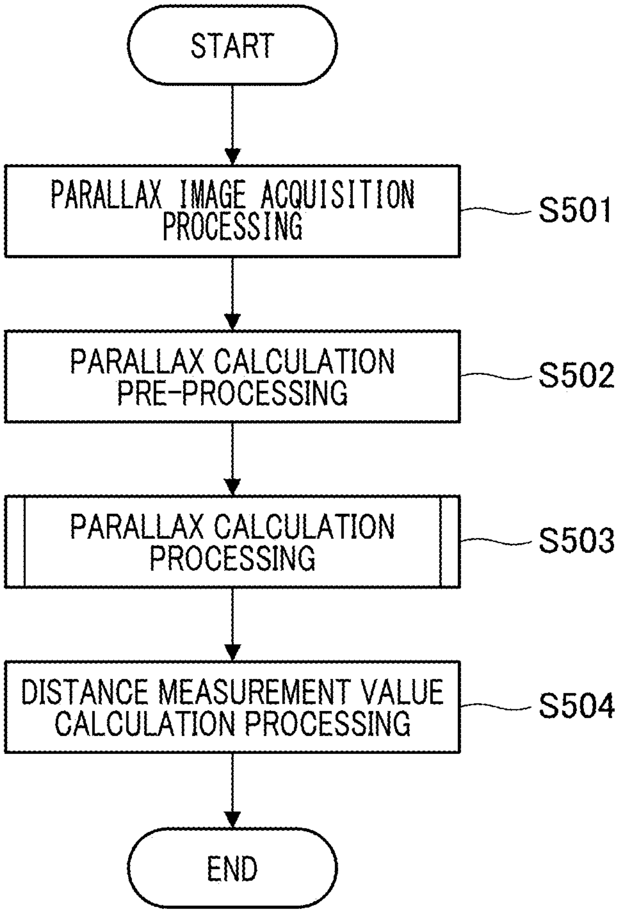
FIG. 5 is a flowchart of distance measurement value calculation processing performed by a distance measurement device 100 according to First Embodiment.

FIG. 5 is a flowchart of distance measurement value calculation processing performed by the distance measurement device 100 according to First Embodiment. Hereinafter, processing performed by the image capturing unit 101, the parallax calculation unit 102, and the distance measurement value calculation unit 103 will be described. Each step of the processing is realized when the CPU provided in the distance measurement device 100 executes a software program. In addition, each step of the processing may be executed by a CPU provided together with the memory 113 provided in an image capturing device 101.

In Step S501, the image capturing unit 101 executes parallax image acquisition processing. Regarding the parallax image acquisition processing, the image capturing unit 101 acquires the first image from the first visual point and the second image from the second visual point having parallax therebetween.

In Step S502, the parallax calculation unit 102 executes parallax calculation pre-processing. Regarding the parallax calculation pre-processing, the parallax calculation unit 102 performs light quantity difference correction processing and bandpass filter processing using a bandpass filter with respect to the first image and the second image acquired in Step S501.

In the light quantity difference correction processing, a difference in light quantity that is an imbalance between light quantities of the first image and the second image caused by the image formation optical system 111 is corrected. The parallax calculation unit 102 corrects the difference in light quantity by revising signal values of the first image and the second image using a light quantity correction value designed in advance.

In the bandpass filter processing, since the SN ratio (ratio of a signal component to a noise component) decreases as a spatial frequency in a frequency band increases, the transmittance in a region of a high spatial frequency is reduced. In addition, even after the light quantity difference correction processing described above, since DC components of the first image and the second image do not completely match due to a manufacturing error or the like, the transmittance near the spatial frequency of zero is set to zero in the bandpass filter processing.

In Step S503, the parallax calculation unit 102 executes parallax calculation processing. In the parallax calculation processing, the amount of parallax corresponding to the distance of a subject is calculated from the first image and the second image subjected to the parallax calculation pre-processing.

In the parallax calculation processing, first, an attention point that is image coordinates for calculating the amount of parallax with respect to the input first image is set, and a verification region centered on the attention point and having horizontal and perpendicular widths equivalent to the size of the search window corresponding to the image height (which will be described below) is set.

Next, in the parallax calculation processing, a reference point is set with respect to the second image, and a reference region centered on the reference point and having horizontal and perpendicular widths equivalent to the size of the search window corresponding to the image height (which will be described below) is set. The reference region has the same size and shape as the verification region.

Next, in the parallax calculation processing, the degree of correlation between a signal of the first image included within the verification region and a signal of the second image included within the reference region is calculated while the reference point is consecutively moved, and the reference point having the highest correlation is set as a corresponding point corresponding to the attention point. The amount of deviation of relative positions between the attention point and the corresponding point is the amount of parallax at the attention point. The amounts of parallax at all pixel positions on an image can be calculated by calculating the amount of parallax while consecutively changing the image coordinates of the attention point.

Any known technique may be used as a method for calculating a degree of correlation. For example, a technique referred to as an NCC for evaluating a normalized cross-correlation between image signals, an SSD for evaluating the sum of squares of the difference in image signalization, and an SAD for evaluating the absolute value of the difference can be used.

NCC is an abbreviation of a normalized cross-correlation. SSD is an abbreviation of the sum of squared difference. SAD is an abbreviation of the sum of absolute difference.

Figure 6A:
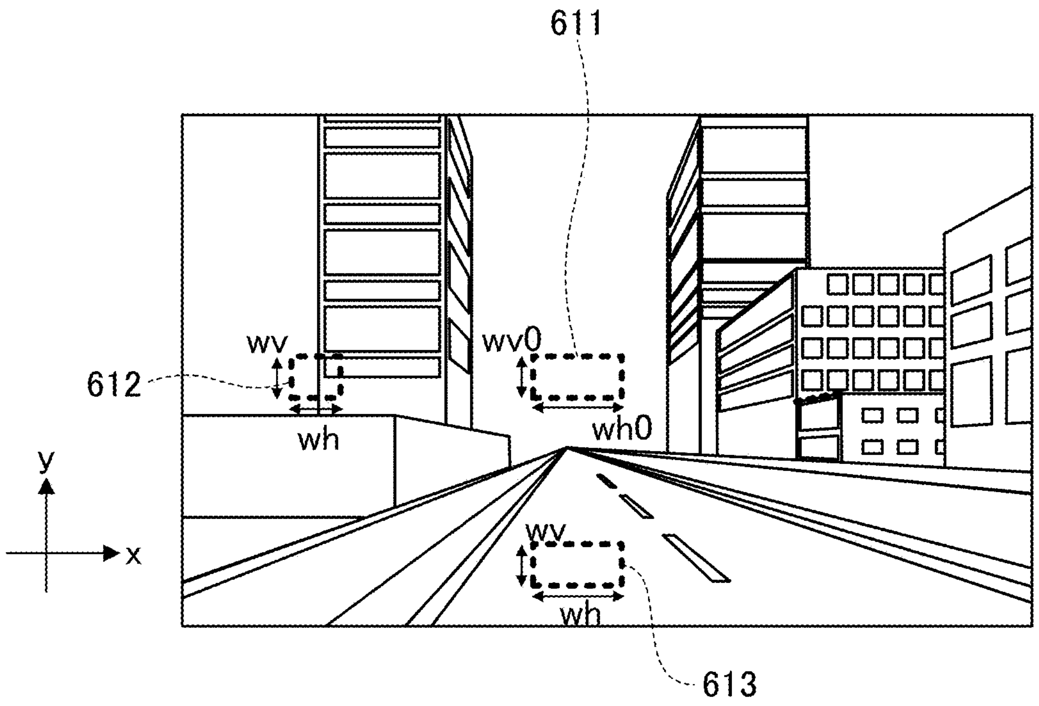
FIGS. 6A and 6B are explanatory views regarding a method for setting a search window.
Figure 6B:
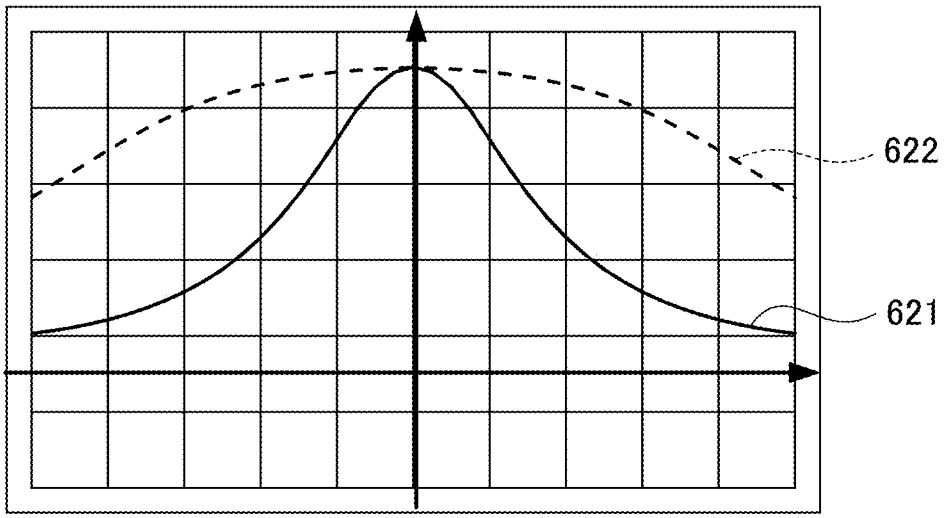

Here, a method for setting a search window will be described using FIG. 6. FIG. 6 is an explanatory view regarding a method for setting a search window. FIG. 6A is a view showing a first image 601. FIG. 6B is a graph in which a baseline length 621 in an image horizontal direction and a baseline length 622 in an image vertical direction are plotted.

FIG. 6A shows a search window 611 at the central image height, a search window 612 at a horizontal peripheral image height, and a search window 613 at a perpendicular peripheral image height which are set according to Present Embodiment in the first image 601. In FIG. 6B, the horizontal axis is standardized and superimposed using the positive and negative largest image heights in the horizontal and perpendicular directions.

Since the first photoelectric conversion portion 131 and the second photoelectric conversion portion 132 described above are produced by being divided in the image horizontal direction, variation in the baseline length 621 increases toward the peripheral image height in the horizontal direction. Meanwhile, since the vertical direction of an image is perpendicular to a separation direction of the first photoelectric conversion portion 131 and the second photoelectric conversion portion 132, there is little variation in centroidal gap between corresponding luminous fluxes, and variation in the baseline length 622 is small even if the image height is varied to the peripheral image height in the vertical direction.

The amount of parallax between the first image and the second image is determined by the value of the baseline length. For this reason, as indicated by the variation in the baseline length 621 in the image horizontal direction, when the size of the search window is large, there is a high possibility that even the same subject will have a different amount of parallax within a search window region at the peripheral image height, and an error in calculation of parallax increases.

On the other hand, from the view point of S/N at the time of correlation calculation, the larger the more desirable as far as the size of the search window is concerned, and the calculation accuracy of a correlation value is improved. Therefore, a problem of trade-off arises in setting of the size of the search window.

Further, Present Embodiment is characterized in that a search window is set on the basis of the optical characteristic value of the image height for which parallax calculation is performed. Specifically, regarding an optical characteristic value, the search window is set based on a value determined by the centroidal gap between a centroid of a first luminous flux forming the first image and a centroid of a second luminous flux forming the second image on the exit pupil of the optical system, namely the baseline length.

The search window 611 at the central image height is set to have a size of the initial setting search window, the size in the horizontal direction is set to wh0, and the size in the horizontal direction is set to wv0. In contrast, the size of the search window at each image height in each of the horizontal and perpendicular directions is set to a value obtained by multiplying the value of the baseline length shown in FIG. 6B by a coefficient k.

A size wh(u, v) of the search window in the horizontal direction at a certain image height (u, v) is set by the following Expression 1 with a coefficient k1, a variation A1(u, v) of the baseline length in the horizontal direction, and a size wh0 of the initial setting search window in the horizontal direction. The size of the search window is set as the number of pixels, namely an integer.

$$wh(u, v) = [k1 \times A1(u, v) \times wh0] \quad \text{(Expression 1)}$$

Similarly, a size wv(u, v) of the search window in the vertical direction at a certain image height (u, v) is set by the following Expression 2 with a coefficient k2, a variation A2(u, v) of the baseline length in the vertical direction, and a size wv0 of the initial setting search window in the vertical direction.

$$wv(u, v) = [k2 \times A2(u, v) \times wv1] \quad \text{(Expression 2)}$$

The coefficient k1 and the coefficient k2 are determined in accordance with the size of a subject, the distribution of distances, or the like presumed when the distance measurement device 100 of Present Embodiment is used. They are determined by a value set in advance, a lookup table value corresponding to a scene, or the like.

FIG. 6A shows the search window 611 at the central image height, the search window 612 at the horizontal peripheral image height, and the search window 613 at the perpendicular peripheral image height each having the size of the search window set as described above. The search window 612 at the horizontal peripheral image height is set to be smaller than the search window 611 at the central image height by the amount corresponding to variation in baseline length in the horizontal direction.

In addition, since variation in baseline length is small, the search window 613 at the perpendicular peripheral image height is set to a size of the search window which scarcely varies compared to that at the center. In the parallax calculation processing, the amount of parallax is calculated using the search window set as described above.

The amount of variation in baseline length within the search window region is reduced by setting the size of the search window as described above. As a result, variation in amount of parallax of the same subject included within the search window region is reduced. Thus, according to Present Embodiment, an error in parallax calculation described above can be reduced.

In Step S504, the distance measurement value calculation unit 103 executes the distance measurement value calculation processing. Regarding the distance measurement value calculation processing, the distance measurement value calculation unit 103 calculates a distance measurement value by converting the amount of parallax calculated in Step S503 into a distance measurement value using a known technique.

In the distance measurement value calculation processing, the amount of parallax is converted into an amount of defocusing using the baseline length. Next, in the distance measurement value calculation processing, the amount of defocusing is converted into the distance measurement value from the image formation optical system to a subject using a focal distance and an image formation formula. The distance measurement value of the entire image is obtained by performing this processing at all the angles of view.

As described above, according to First Embodiment, it is possible to provide a distance measurement device in which an error at the time of parallax calculation is reduced by determining setting of the search window at the time of correlation calculation in the parallax calculation processing based on the baseline length varying depending on the image height. Namely, even when the value of the baseline length varies in accordance with the image height, it is possible to provide a distance measurement device in which variation in accuracy of distance measurement corresponding to the image height can be reduced.

Second Embodiment

Next, Second Embodiment of the present invention will be described. In Second Embodiment, an example in which a value obtained by dividing the value of the baseline length for each image height by the focal distance for each image height is used as an optical characteristic value for determining the size of the search window will be described. The constitution of Second Embodiment is similar to that of First Embodiment, and differences will be described hereinafter.

When the exit pupil distance differs for each image height, since the baseline length is the distance between the centroids of respective luminous fluxes on the exit pupil, the value varies upon reception of an influence of the exit pupil distance. Therefore, when variation in focal distance for each image height is significant, it is more accurate to express the centroid of each luminous flux by a ray angle instead of the distance between the centroids of the respective luminous fluxes and express it by the optical characteristic value of the baseline length corresponding to an F value of the optical system.

In Present Embodiment, when the focal distance for each image height is f(u, v), the size wh(u, v) of the search window in the horizontal direction and the size wv(u, v) of the search window in the vertical direction at the certain image height (u, v) can be set as in Expression 3 and Expression 4.

$$wh(u, v) = \left[k1 \times \frac{A1(u, v)}{f(u, v)} \times wh0\right] \quad \text{(Expression 3)}$$

$$wv(u, v) = \left[k2 \times \frac{A2(u, v)}{f(u, v)} \times wv0\right] \quad \text{(Expression 4)}$$

According to Present Embodiment, by performing setting as described above, it is possible to provide a distance measurement device in which variation in accuracy of distance measurement corresponding to the image height can be reduced with higher accuracy even if variation in focal distance corresponding to the image height is significant.

Figure 7A:
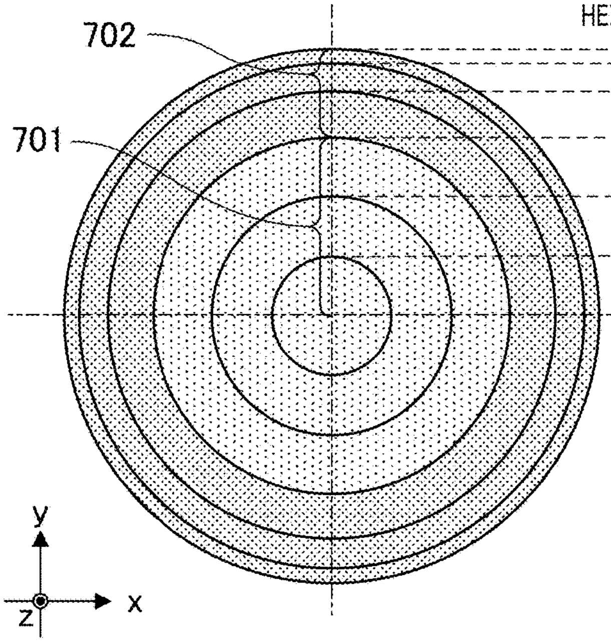
FIGS. 7A, 7B, and 7C are explanatory views regarding the image capturing unit according to Second Embodiment.
Figure 7B:
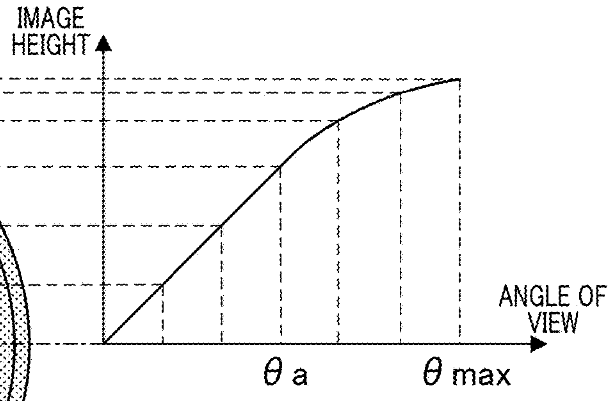

FIG. 7 is an explanatory view regarding the image capturing unit according to Second Embodiment. FIGS. 7A and 7B show characteristics of an optical system according to Present Embodiment. FIG. 7A shows a distribution of luminous fluxes with respect to the angles of view on the exit pupil. In FIG. 7B, the vertical axis indicates the image height of the image capturing element, and the horizontal axis indicates the received luminous flux range per unit image height, namely the angle of view.

The rate of increase in the graph of FIG. 7B (=image height/angle of view) in a first region 701 corresponding to the central image height included in the range of a first angle of view that is smaller than an angle of view θa will be regarded as a first rate of variation. The rate of increase in the graph of FIG. 7B (=image height/angle of view) in a second region 702 corresponding to the peripheral image height included in the range of a second angle of view that is equal to or larger than the angle of view θa will be regarded as a second rate of variation.

At this time, regarding the magnitude relationship between the rates of increase, first rate of variation>second rate of variation is established. The optical characteristics of the image capturing unit according to Present Embodiment have distortion characteristics which differ between the center and the periphery, and the angle of view on the periphery is image-captured in a compressed manner.

Here, the first rate of variation is a rate of variation of the number of pixels included per unit angle of view at the first angle of view in the first region corresponding to the central image height with respect to the image height. In addition, the second rate of variation is a rate of variation of the number of pixels included per unit angle of view at the second angle of view in the second region corresponding to the peripheral image height to the image height.

In Present Embodiment, the first rate of variation is larger than the second rate of variation. In this manner, in the optical system according to Present Embodiment, the distortion characteristics differ between the central image height and the peripheral image height.

In Present Embodiment, variation in accuracy of distance measurement can be reduced by performing the parallax calculation method, namely performing setting of a search window according to the present invention described above in the constitution of such an image capturing unit. When the image capturing unit has optical characteristics shown in FIGS. 7A and 7B, since variation in focal distance is also significant with respect to variation in image height, in Present Embodiment, the size of the search window is set using a value obtained by dividing the baseline length described above by the focal distance.

Figure 7C:
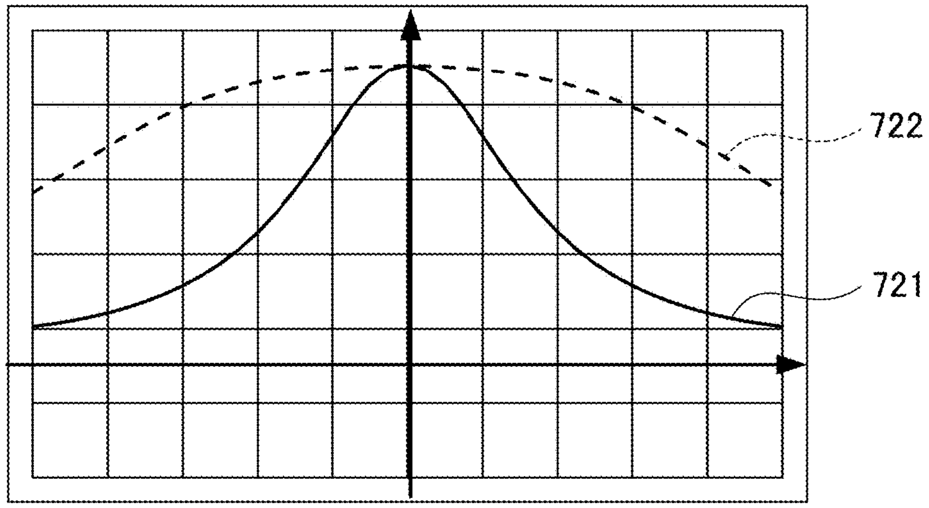

FIG. 7C is a graph in which a value 721 obtained by dividing the baseline length in the image horizontal direction by the focal distance at each image height and a value 722 obtained by dividing the baseline length in the image vertical direction by the focal distance at each image height are plotted. In FIG. 7C, the horizontal axis is standardized and superimposed using the positive and negative largest image heights in the horizontal and perpendicular directions. In Present Embodiment, the size of the search window is set by the technique described above using the value 721 and the value 722 shown in FIG. 7C and Expression 3 and Expression 4.

Figure 8:
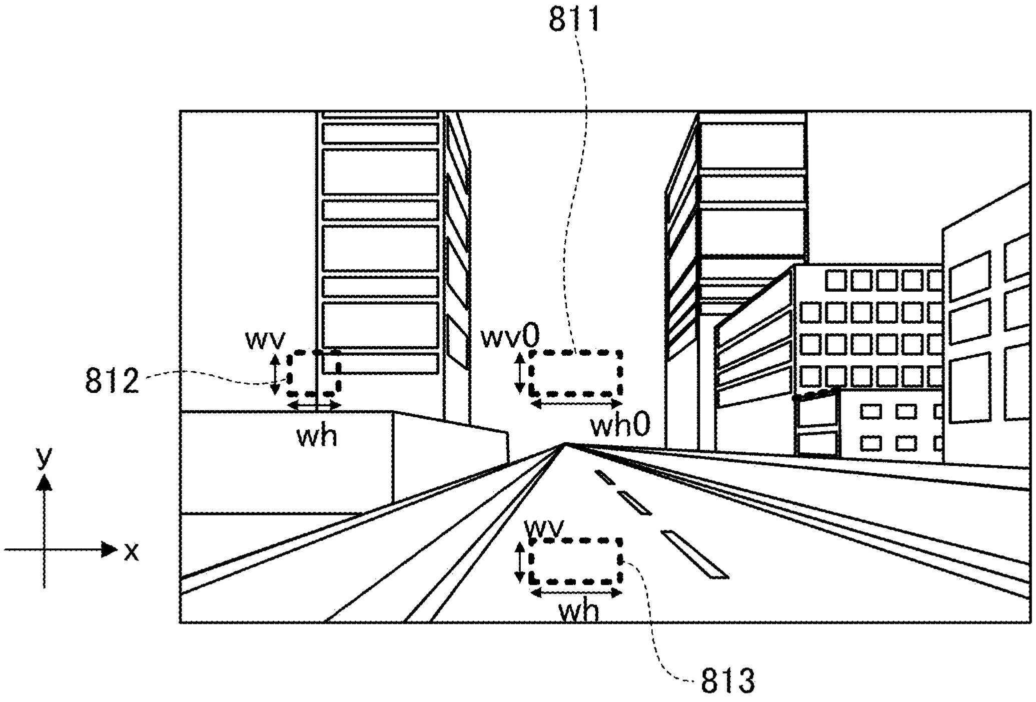
FIG. 8 is a view showing a size of the search window set at the time of correlation calculation according to Second Embodiment.

FIG. 8 is a view showing a size of the search window set at the time of correlation calculation according to Present Embodiment. FIG. 8 shows a search window 811 at the central image height, a search window 812 at the horizontal peripheral image height, and a search window 813 at the perpendicular peripheral image height.

According to Present Embodiment, as described above, it is possible to provide a distance measurement device in which variation in accuracy of distance measurement can be reduced even when variation in focal distance is significant with respect to variation in image height by setting the size of the search window on the basis of the optical characteristic value obtained by dividing the baseline length by the focal distance at each image height.

In addition, according to Present Embodiment, since a wide-angle image is obtained but the size of the search window becomes small at the peripheral image height where variation in focal distance is significant and the value becomes small, a probability that a different subject is included in the search window is reduced, which is favorable from the view point of in-plane resolution.

Figure 9A:
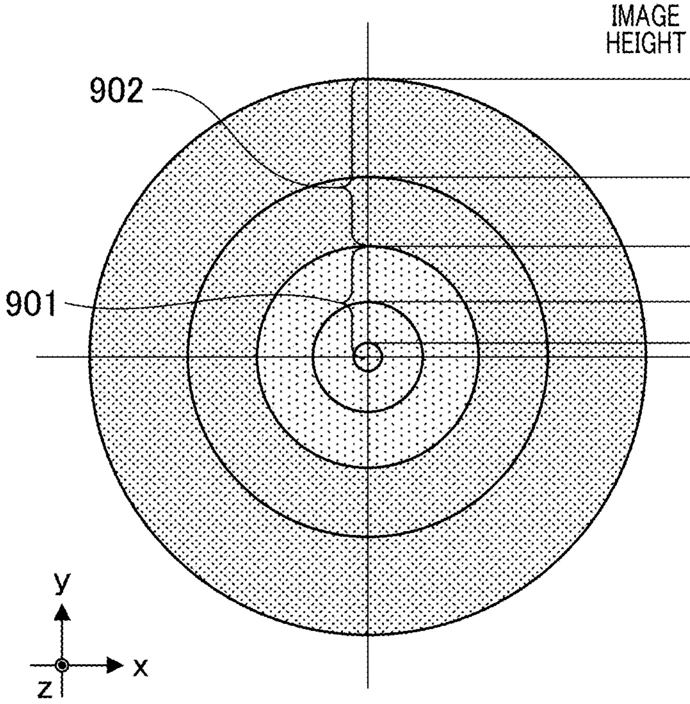
FIGS. 9A and 9B are views showing an example different from that in FIG. 7 regarding optical characteristics of the image capturing unit.
Figure 9B:
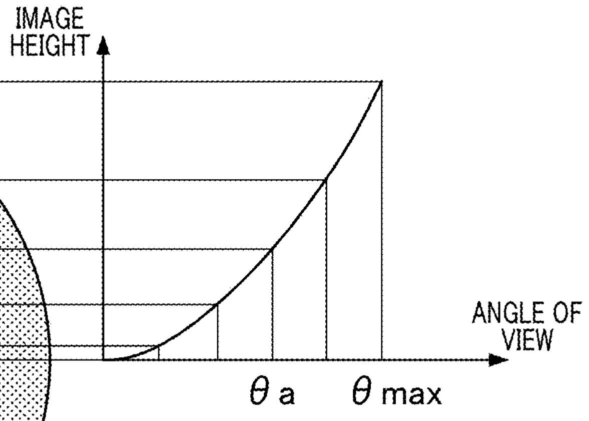

In Present Embodiment, the optical characteristics of the image capturing unit are not limited to the described constitution. FIG. 9 is a view showing an example different from that in FIG. 7 regarding optical characteristics of the image capturing unit. FIG. 9A shows a distribution of luminous fluxes with respect to the angles of view on the exit pupil. In FIG. 9B, the vertical axis indicates the image height of the image capturing element, and the horizontal axis indicates the received luminous flux range per unit image height, namely the angle of view.

Present Embodiment can also be applied to an image capturing unit of an optical system having the optical characteristics shown in FIGS. 9A and 9B. The example in FIGS. 9A and 9B shows a constitution in which the rate of variation of image height/angle of view is larger in a peripheral region 902 than in a central region 901, namely a constitution in which the angle of view on the periphery is image-captured in an enlarged manner.

In Present Embodiment, the first rate of variation that is a rate of variation at the center is smaller than the second rate of variation that is a rate of variation on the periphery. According to Present Embodiment, even in the constitution of FIGS. 9A and 9B, variation in accuracy of distance measurement can be reduced by setting the size of the search window on the basis of the optical characteristic value obtained by dividing the baseline length by the focal distance at each image height.

Third Embodiment

In the present invention, the constitution of the image capturing element 112 is not limited to the constitution described in First Embodiment. In Third Embodiment, an example different from the constitution shown in FIG. 2 will be described.

The photoelectric conversion portions within the pixel 120 can be constituted in arbitrary division directions, and the size of the search window may be set on the basis of variation in optical characteristic values in directions defining the size of the search window, namely in the image horizontal direction and the image vertical direction.

Figure 10A:
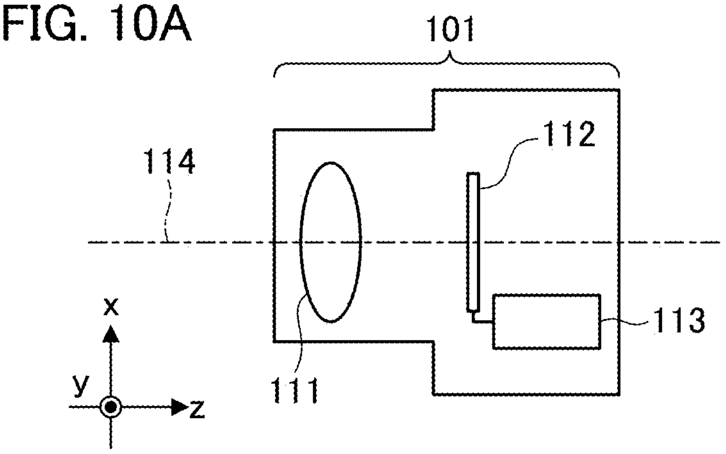
FIGS. 10A, 10B, and 10C are views showing detailed constitutions of the image capturing unit according to Third Embodiment.

FIG. 10 is a view showing detailed constitutions of the image capturing unit according to Third Embodiment. The image capturing unit 101 shown in FIG. 10A is similar to that of First Embodiment in FIG. 2A. In Present Embodiment, the constitution of the image capturing element 112 differs from that in First Embodiment.

Figure 10B:
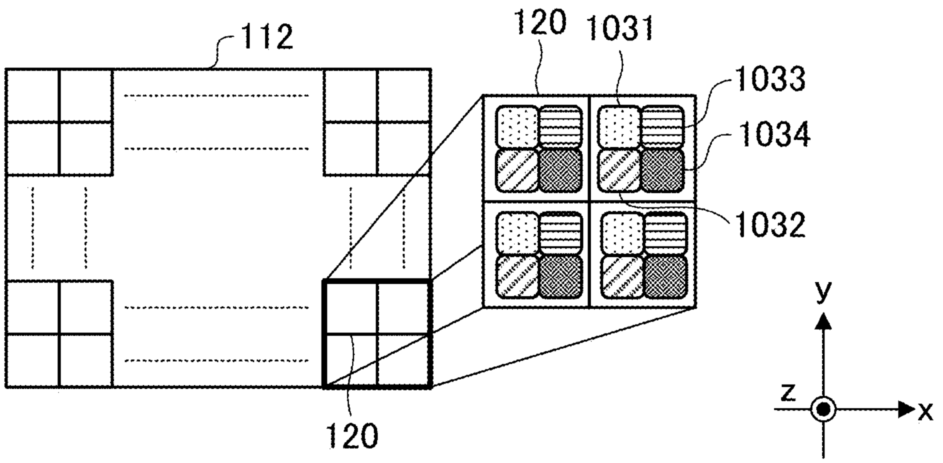

FIG. 10B is an xy cross-sectional view of the image capturing element 112 according to Third Embodiment. That is, FIG. 10B is a view showing the image capturing element 112 cut along a plane orthogonal to the z axis.

According to Present Embodiment, the image capturing element 112 includes a first photoelectric conversion portion 1031, a second photoelectric conversion portion 1032, a third photoelectric conversion portion 1033, and a fourth photoelectric conversion portion 1034 divided in the image horizontal direction (first direction) and the image vertical direction (second direction) within the pixel 120.

In Present Embodiment, the pixel is quadrisected. According to such a constitution, distance measurement can be performed in any direction in which parallax is present, such as the image horizontal direction, the image vertical direction, and the image diagonal direction depending on the way of combining photoelectric conversion portions of the four photoelectric conversion portions used for generating the first image and the second image.

Here, the first image is regarded as an image which is read by adding outputs of the first photoelectric conversion portion 1031 and the second photoelectric conversion portion 1032. Moreover, the second image is regarded as an image which is read by adding outputs of the third photoelectric conversion portion 1033 and the fourth photoelectric conversion portion 1034. When the first image and the second image are used, a set of images having parallax therebetween in the image horizontal direction can be acquired.

In addition, a third image is regarded as an image which is read by adding outputs of the first photoelectric conversion portion 1031 and the third photoelectric conversion portion 1033. Moreover, a fourth image is regarded as an image which is read by adding outputs of the second photoelectric conversion portion 1032 and the fourth photoelectric conversion portion 1034. When the third image and the fourth image are used, a set of images having parallax therebetween in the image vertical direction can be acquired.

In addition, when a fifth image obtained by reading an output of the first photoelectric conversion portion 1031 and a sixth image obtained by reading an output of the fourth photoelectric conversion portion 1034 are used, a set of images having parallax therebetween in the image diagonal direction can be acquired.

In addition, when a seventh image obtained by reading an output of the second photoelectric conversion portion 1032 and an eighth image obtained by reading an output of the third photoelectric conversion portion 1033 are used, a set of images having parallax therebetween in the image diagonal direction different from the case of the fifth image and the sixth image by 90 degrees can be acquired.

According to Present Embodiment, variation in accuracy of distance measurement can be reduced similarly to the Examples described above by setting a search window with respect to a set of images having parallax therebetween as described above. A search window in a case of having parallax in the image horizontal direction and the image vertical direction is set as described above.

Figure 10C:
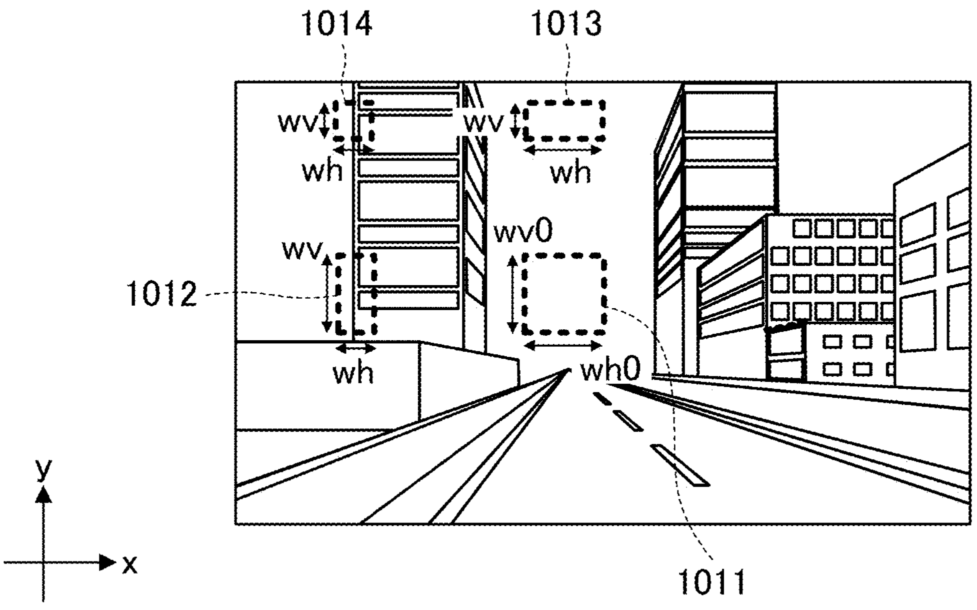

FIG. 10C is an explanatory view of an example of setting a search window when the fifth image obtained by reading an output of the first photoelectric conversion portion 1031 and the sixth image obtained by reading an output of the fourth photoelectric conversion portion 1034 are used.

In this case, since the direction in which variation in baseline length is significant becomes a diagonal direction, a search window 1011 at the central image height, a search window 1012 at the horizontal peripheral image height, a search window 1013 at the perpendicular peripheral image height, and a search window 1014 at a diagonal peripheral image height are as shown in FIG. 10C.

According to Present Embodiment, in this manner, even in the case of a set of images having parallax therebetween in the diagonal direction, it is possible to provide a distance measurement device in which variation in accuracy of distance measurement is reduced.

The constitution of the image capturing element is not limited to that of Present Embodiment. For example, such that the direction in which parallax is present becomes the image vertical direction a constitution including a first photoelectric conversion portion and a second photoelectric conversion portion divided in the image vertical direction inside the pixel 120 may be adopted.

According to such a constitution, a set of images having parallax therebetween in the image vertical direction can be acquired, and distance measurement of a subject having texture in the image horizontal direction can be performed. It is possible to provide a distance measurement device in which variation in accuracy of distance measurement is reduced by setting a search window using the technique according to the present invention even in such a constitution.

Fourth Embodiment

There are a plurality of factors for accuracy of correlation calculation, and it is affected by the amount of texture included within the search window depending on a subject and the image S/N. However, from the view point of the statistics of the image S/N, the total number of pixels included within the search window affects the accuracy of correlation calculation.

Present Embodiment shows an example in which the accuracy of correlation calculation becomes constant by causing the total number of pixels within the search window to be constant regardless of the image height. The total number of pixels S0 included within the search window at the central image height used as a reference is expressed by Expression 5.

$$S0 = wh0 \times wv0 \quad \text{(Expression 5)}$$

When the direction in which parallax is present is the image horizontal direction, since the image horizontal direction affects variation in accuracy of distance measurement in a similar manner, the size of the search window in the horizontal direction is determined by Expression 6 as described above.

$$wh(u, v) = \left[k1 \times \frac{A1(u, v)}{f(u, v)} \times wh0\right] \quad \text{(Expression 6)}$$

Further, the size of the search window in the image vertical direction is set to a value obtained by dividing S0 by wh(u, v) such that the total number of pixels becomes constant and is determined by Expression 7 such that it becomes an integer.

$$wv(u, v) = \left[\frac{S0}{wh(u, v)}\right] \quad \text{(Expression 7)}$$

According to Present Embodiment, as described above, it is possible to provide a distance measurement device in which fluctuation in distance measurement caused by the statistics of the image S/N at the time of correlation calculation is also reduced by setting the size of the search window such that the total number of pixels included within the search window becomes constant.

Fifth Embodiment

Figure 11A:
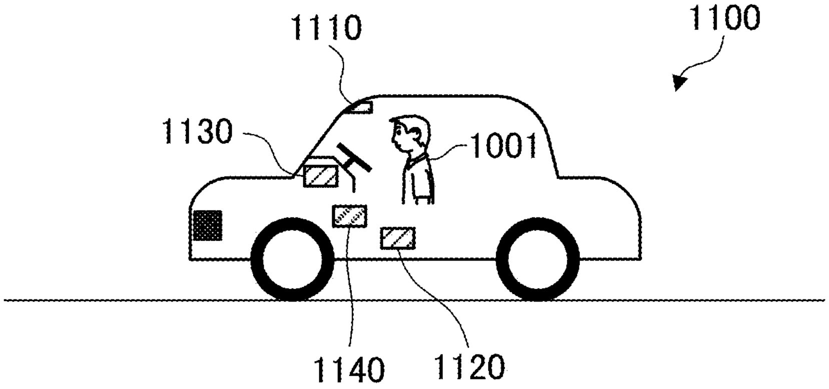
FIGS. 11A and 11B are views showing a utilization form of a distance measurement device according to Fifth Embodiment.

In Fifth Embodiment, an example of a utilization form of the distance measurement device according to the present invention will be described. FIG. 11 is a view showing a utilization form of a distance measurement device according to Fifth Embodiment. FIG. 11A is a view showing a schema of a situation in which a distance measurement device 1110 according to Fifth Embodiment is used by being mounted in a vehicle 1100 (movable apparatus).

Figure 11B:
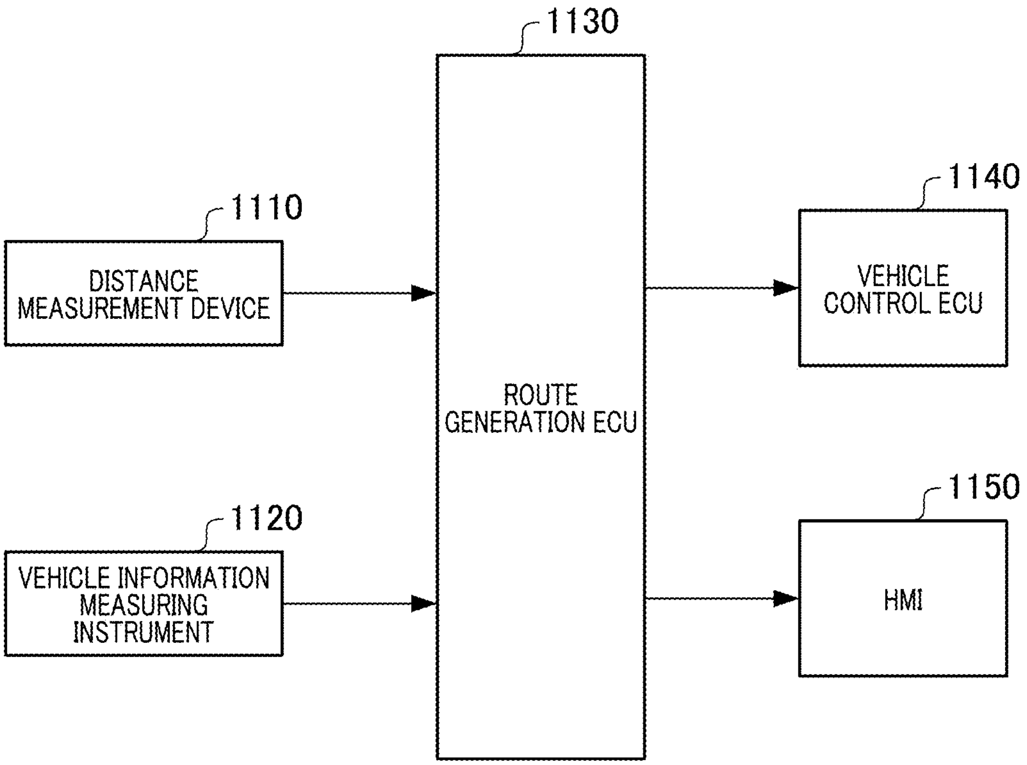

FIG. 11B is a block diagram of the constitution shown in FIG. 11A. The movable apparatus having the distance measurement device 1110 mounted therein is not limited to a vehicle (automobile) and may be various kinds of public transportation such as a train or an airplane, or various kinds of robots such as small mobility or an automatic guided vehicle (AGV).

In FIG. 11A, the vehicle 1100 includes the distance measurement device 1110 according to Fifth Embodiment. The distance measurement device 1110 includes each of the constituents of the distance measurement device 100 described above in each of the Examples.

The vehicle 1100 further includes a vehicle information measuring instrument 1120, a route generation ECU 1130, and a vehicle control ECU 1140. The vehicle information measuring instrument 1120 is a measuring instrument for detecting a traveling speed and a steering angle of the vehicle 1100. ECU is an abbreviation of an electronic control unit.

Regarding another form of the route generation ECU 1130 and the vehicle control ECU 1140, they may be constituted of a CPU and a memory storing an arithmetic processing program. In addition, the vehicle 1100 may include an HMI 1150. HMI is an abbreviation of a human machine interface.

The distance measurement device 1110 captures images of a surrounding environment including a traveling road of the vehicle 1100, generates image information indicating the captured images and distance image information having information indicating the distance to a subject for each pixel, and outputs them to the route generation ECU 1130.

As shown in FIG. 11, the distance measurement device 1110 is disposed in the vicinity of an upper end of a windshield of the vehicle 1100 and captures images of a region within a predetermined angle range (hereinafter, an image capturing angle of view) toward the side in front of the vehicle 1100.

The information indicating the distance to a subject need only be information which can be converted into a distance to a subject within the image capturing angle of view from an image capturing device 1110, and it may be a predetermined reference table or information which can be converted using a predetermined conversion coefficient and a conversion formula.

For example, the image capturing device 1110 may allocate a distance value to a predetermined integer value and output it to the route generation ECU 1130. In addition, the image capturing device 1110 may output information which can be converted into the distance to a subject and can be converted into an optically conjugate distance value (a distance from the image capturing element to a conjugate point (a so-called amount of defocusing)) to the route generation ECU 1130.

In addition, the image capturing device 1110 may output information which can be converted into the distance to a subject and can be converted into the distance from the optical system to a conjugate point (a distance from the image side main point to the conjugate point)) to the route generation ECU 1130.

The route generation ECU 1130 is constituted using a logic circuit, for example. The route generation ECU 1130 generates target route information regarding at least any one of a target traveling trajectory and a target traveling speed of the vehicle 1100 based on a measurement signal from the vehicle information measuring instrument 1120, and the image information and the distance image information from the distance measurement device 1110.

The route generation ECU 1130 successively outputs the generated target route information to the vehicle control ECU 1140. The vehicle control ECU 1140 controls movement operation of the vehicle 1100 such that the traveling speed and the amount of steering of the vehicle 1100 have a control target value.

Specifically, the vehicle control ECU 1140 controls engine braking and steering in accordance with the target route information. The vehicle control ECU 1140 may warn a driver 1001 in accordance with the target route information without controlling movement operation of the vehicle 1100. The vehicle control ECU 1140 may perform both warning and controlling movement operation of the vehicle 1100.

In addition, when the vehicle 1100 includes the HMI 1150, the driver 1001 can be notified of the target route information generated by the route generation ECU 1130 through the HMI 1150. The HMI 1150 notifies the driver 1001 by displaying an image or by audio.

The accuracy of the distance information output regardless of the image height, namely the angle of view is improved by applying the technique of setting the size of a search window according to the present invention to the distance measurement device 1110 so that the accuracy of the target route information output from the route generation ECU 1130 is improved. It is possible to achieve safer vehicle driving control due to the improvement in accuracy of this target route information.

When the distance measurement device is mounted in a movable apparatus such as a vehicle, diverse measurement conditions are expected in accordance with the traveling scene and the state. Specifically, examples of the traveling scene include a traveling scene in which the environmental light quantity is low with a strict S/N ratio such as in a tunnel or at night, a high-speed traveling scene requiring a high frequency of information updating, and a traveling scene on the street or at an intersection particularly requiring the accuracy of distance measurement at the peripheral image height.

In such cases, safer vehicle driving control is achieved, which is favorable, by setting the size of the search window in consideration of the viewpoint corresponding to the traveling scene in addition to the viewpoint of the optical characteristic value described above.

Recognition of the traveling scene can be performed by the route generation ECU 1130 through the recognition processing with respect to the captured images acquired by the distance measurement device 1110. That is, the route generation ECU 1130 has a recognition portion recognizing the traveling scene.

This recognition portion may be provided in the distance measurement device 1110, and the distance measurement device 1110 may execute recognition of the traveling scene. The parallax calculation unit 102 sets a search window in accordance with the recognized traveling scene and calculates the amount of parallax using this search window.

In a traveling scene in which the environmental light quantity is low with a strict S/N ratio such as in a tunnel or at night, the coefficients k1 and k2 which are coefficients related to setting of a search window described above are set as values larger than those at during daytime outdoor driving and are adjusted in a direction in which the total number of pixels within the search window increases.

Accordingly, the accuracy of correlation calculation due to the total number of pixels included within the search window at the time of correlation calculation can be adjusted in an advantageous direction, and variation in accuracy of distance measurement can be reduced.

In addition, in a high-speed traveling scene, the total number of pixels within the search window is reduced by setting the values of the coefficients k1 and k2 to values smaller than those during normal speed traveling, the calculation time required for correlation calculation per pixel is shortened, and the updating frequency of a distance measurement result is improved. Accordingly, the updating frequency of a control result based on the distance measurement result with respect to the amount of movement of the host vehicle is improved, and thus safer vehicle driving control can be realized.

In addition, in a traveling scene on the street or at an intersection, since it is desired to detect subjects jumping out from surrounding areas, priority is given to the presence or absence of detection even if variation in accuracy of distance measurement is allowed, and it is also favorable to cause the values of the coefficients k1 and k2 to be values larger than those during normal speed traveling such that the search window does not become excessively small.

According to Present Embodiment, as described above, an optimal search window can be set while reducing variation in accuracy of distance measurement in accordance with the traveling scene of the vehicle, and thus safer vehicle driving control can be realized.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the distance measurement device and the like through a network or various storage media. Then, a computer (or a CPU, an MPU, or the like) of the distance measurement device and the like may be configured to read and execute the program. In such a case, the program and the storage medium storing the program configure the present invention.

In addition, the present invention includes those realized using at least one processor or circuit configured to function of the embodiments explained above, for example. Dispersion processing may be performed using a plurality of processors.

This application claims the benefit of Japanese Patent Application No. 2023-025887, filed on Feb. 22, 2023, which is hereby incorporated by reference herein in its entirety.

What is claimed is:

1. A distance measurement device comprising:

an image capturing unit configured to be capable of capturing images of first image information and second image information having parallax therebetween from one optical system; and at least one processor or circuit configured to function as:

a parallax calculation unit configured to extract image information within a search window from each of the first image information and the second image information and calculate an amount of parallax using a correlation between image information of the first image information within the search window and image information of the second image information within the search window which have been extracted, wherein the parallax calculation unit sets the search window on the basis of an optical characteristic value of an image height for performing parallax calculation, and the optical characteristic value corresponds to a centroidal gap between a centroid of a first luminous flux forming the first image information and a centroid of a second luminous flux forming the second image information on an exit pupil of the optical system.

2. The distance measurement device according to claim 1, wherein the optical characteristic value is a value obtained by dividing the centroidal gap by a focal distance at each image height.

3. The distance measurement device according to claim 1, wherein the optical system has different distortion characteristics between a central image height and a peripheral image height, a first rate of variation is a rate of variation of the number of pixels included per unit angle of view at a first angle of view in a first region corresponding to the central image height with respect to the image height, a second rate of variation is a rate of variation of the number of pixels included per unit angle of view at a second angle of view in a second region corresponding to the peripheral image height to the image height, and the first rate of variation is larger than the second rate of variation.

4. The distance measurement device according to claim 1, wherein the optical system has different distortion characteristics between a central image height and a peripheral image height, a first rate of variation is a rate of variation of the number of pixels included per unit angle of view at a first angle of view in a first region corresponding to the central image height with respect to the image height, a second rate of variation is a rate of variation of the number of pixels included per unit angle of view at a second angle of view in a second region corresponding to the peripheral image height to the image height, and the first rate of variation is smaller than the second rate of variation.

5. The distance measurement device according to claim 1, wherein the image capturing unit has a photoelectric conversion portion of an image capturing element, and the photoelectric conversion portion includes a first photoelectric conversion portion and a second photoelectric conversion portion divided in a vertical direction.

6. The distance measurement device according to claim 1, wherein the image capturing unit has a photoelectric conversion portion of an image capturing element, and the photoelectric conversion portion includes a first photoelectric conversion portion and a second photoelectric conversion portion divided in a horizontal direction.

7. The distance measurement device according to claim 1, wherein the image capturing unit has a photoelectric conversion portion of an image capturing element, and the photoelectric conversion portion includes a first photoelectric conversion portion, a second photoelectric conversion portion, a third photoelectric conversion portion, and a fourth photoelectric conversion portion in divided in a first direction and a second direction different from the first direction.

8. The distance measurement device according to claim 1, wherein the total number of pixels included in the search window is constant regardless of the image height.

9. A movable apparatus comprising:

an image capturing unit configured to be capable of capturing images of first image information and second image information having parallax therebetween from one optical system; and at least one processor or circuit configured to function as:

a parallax calculation unit configured to extract image information within a search window from each of the first image information and the second image information and calculate an amount of parallax using a correlation between image information of the first image information within the search window and image information of the second image information within the search window which have been extracted, wherein the parallax calculation unit sets the search window on the basis of an optical characteristic value of an image height for performing parallax calculation, the optical characteristic value corresponds to a centroidal gap between a centroid of a first luminous flux forming the first image information and a centroid of a second luminous flux forming the second image information on an exit pupil of the optical system, and a control unit configured to issue a warning or control movement operation of the movable apparatus based on a distance measurement result using the amount of parallax calculated by the parallax calculation unit.

10. The movable apparatus according to claim 9, wherein the at least one processor or circuit is further configured to function as a recognition unit configured to recognize a traveling scene, and the parallax calculation unit sets the search window in response to a traveling scene recognized by the recognition unit.

11. A method for controlling a distance measurement device comprising:

image-capturing of capturing images of first image information and second image information having parallax therebetween from one optical system; and parallax-calculating of extracting image information within a search window from each of the first image information and the second image information and calculating an amount of parallax using a correlation between image information of the first image information within the search window and image information of the second image information within the search window which have been extracted, wherein the parallax-calculating sets the search window on the basis of an optical characteristic value of an image height for performing parallax calculation, and the optical characteristic value corresponds to a centroidal gap between a centroid of a first luminous flux forming the first image information and a centroid of a second luminous flux forming the second image information on an exit pupil of the optical system.

* * * * *